United States Patent [19]
Barnes et al.

[11] Patent Number: 5,724,197
[45] Date of Patent: Mar. 3, 1998

[54] ACTUATOR WHICH COMPENSATES FOR COMPACT DISK TILT ERROR

[75] Inventors: Lawrence A. Barnes, Fairport; Philip Frank Marino; Gary R. Bisson, both of Rochester, all of N.Y.

[73] Assignee: Eastman Kodak Company, Rochester, N.Y.

[21] Appl. No.: 696,763

[22] Filed: Aug. 14, 1996

[51] Int. Cl.⁶ .................................................. G02B 7/02
[52] U.S. Cl. ...................... 359/824; 389/814; 369/44.18
[58] Field of Search ........................... 359/813, 814, 359/822, 823, 824; 369/44.15, 44.16

[56] References Cited

U.S. PATENT DOCUMENTS

| | | | |
|---|---|---|---|
| 4,767,187 | 8/1988 | Gijzen et al. | 359/823 |
| 4,927,235 | 5/1990 | Narumi | 359/814 |
| 5,007,712 | 4/1991 | Kikuchi et al. | 359/823 |
| 5,220,459 | 6/1993 | Ichikawa et al. | 359/814 |
| 5,428,589 | 6/1995 | Shtipelman | 369/44.15 |

*Primary Examiner*—Loha Ben
*Attorney, Agent, or Firm*—Raymond L. Owens

[57] ABSTRACT

An optical actuator for positioning a lens to focus a laser light beam on a surface of a compact disk, and to compensate for tilt errors in the surface of the compact disk, including a lens mount for supporting the lens; a base; at least two pairs of spaced-apart flexures, each pair of flexures being fixed to the lens mount and to a base, the flexures of one pair being arranged so that they are non-parallel when viewed from the side and the distance between flexures at the base is less than the distance at the position where they are mounted to the lens mount and the other pair of flexures being arranged so that they are non-parallel when viewed from the side and the distance between flexures at the base is greater than the distance at the position where they are mounted to the lens mount; and applying a force to the lens mount along a line and between the flexures so that when viewed from the parallel flexure side the line bisects each flexure to cause the flexures to deflect such that as the lens moves in a vertical direction to focus the light beam, it also rotates to maintain a nearly perpendicular alignment of the optical axis to the compact disk surface, minimizing the residual tilt error.

6 Claims, 4 Drawing Sheets

5,724,197

ACTUATOR WHICH COMPENSATES FOR COMPACT DISK TILT ERROR

FIELD OF THE INVENTION

This invention relates to optical actuators, and more particularly to optical actuators which compensate for tilt errors in a compact disk.

BACKGROUND OF THE INVENTION

An optical disk recording and reading device includes a lens which focuses a laser light beam onto an optical disk while the disk is rotating. Focus and/or tracking actuators are used in optical disk recording and reading devices to control the position of the lens relative to the rotating disk. The actuators are necessary because of unavoidable warp of the disks, spindle errors, and other mechanical and optical imperfections.

Both focus and tracking of optical disks must continuously be maintained while the disks are recording and/or reading. Focus is controlled by adjusting the distance between the lens and the disk surface. Tracking is controlled by maintaining the lens at the correct radial position such that a single data track is read or written at a time. The motions of the actuator are controlled by a servo system.

Alignment of the optical axis of the lens to the disk (i.e., lens tilt) must be maintained accurately for the system to function properly. A conventional prior art compact disk 10 is shown in FIG. 1, the compact disk 10 is formed with a central opening 12, which includes a region 14 where the compact disk 10 is clamped during reading or writing. As shown in FIG. 2 there is a tilt or sloping of the compact disk writing surface 18 relative to the spindle axis 16 of a device for rotating the compact disk 10 as it is either read or written on. For clarity of discussion the clamping, spindle and rotating mechanism are not shown. Any tilt of the compact disk writing surface 18 relative to the optical axis of the objective lens reduces system performance. A significant contributor to this tilt is the non-flatness of the compact disk 10 itself, in particular, the symmetric deflection (bowl shape) of the compact disk 10. For this type of distortion, the tilt of the compact disk writing surface 18 at any point on the compact disk 10 depends only on the radius of that point. Tilt of the compact disk 10 is defined as the radial slope of the warped shape. Tilt of the lens of the actuator is any change of the angular orientation of the optical axis relative to its original orientation. Tilt error is the total non-perpendicularity between the lens optical axis and the compact disk writing surface 18.

SUMMARY OF THE INVENTION

It is an object of this invention to provide optical actuators which minimized tilt errors due to compact disk surface tilt.

These objects are achieved by an optical actuator for positioning a lens to focus a laser light beam on a surface of a compact disk, and to compensate for tilt errors in the surface of the compact disk, comprising:

a) a lens mount for supporting the lens;

b) a base;

c) at least two pairs of spaced-apart flexures, each pair of flexures being fixed to the lens mount and to the base, the flexures of one pair being arranged so that they are non-parallel when viewed from the side and the distance between flexures at the base is less than the distance at the position where they are mounted to the lens mount and the other pair of flexures being arranged so that they are non-parallel when viewed from the side and the distance between flexures at the base is greater than the distance at the position where they are mounted to the lens mount; and d) means for applying a force to the lens mount to cause the flexures to deflect such that as the lens moves in a vertical direction to focus the light beam, it also rotates to maintain a nearly perpendicular alignment of the optical axis to the compact disk surface, minimizing the residual tilt error.

ADVANTAGES

An optical actuator according to this invention minimizes the problem associated with the tilt error of the surface of compact disks.

An optical actuator according to this invention provides improved system performance by providing more effective use of the available laser power, and better controlled spot size, shape and quality of the laser light beam.

An optical actuator according to this invention provides improved system performance by providing improved reading and writing on compact disks.

Another advantage of this invention is improved system performance due to decreased optical aberration caused by the relative tilt of the compact disk and objective lens.

Another advantage of the invention is that it eliminates correction apparatus which requires sensing device, control electronics and an electromagnetic mechanism for tilting the lens mount.

DETAILED DESCRIPTION OF THE INVENTION

Figure 1:
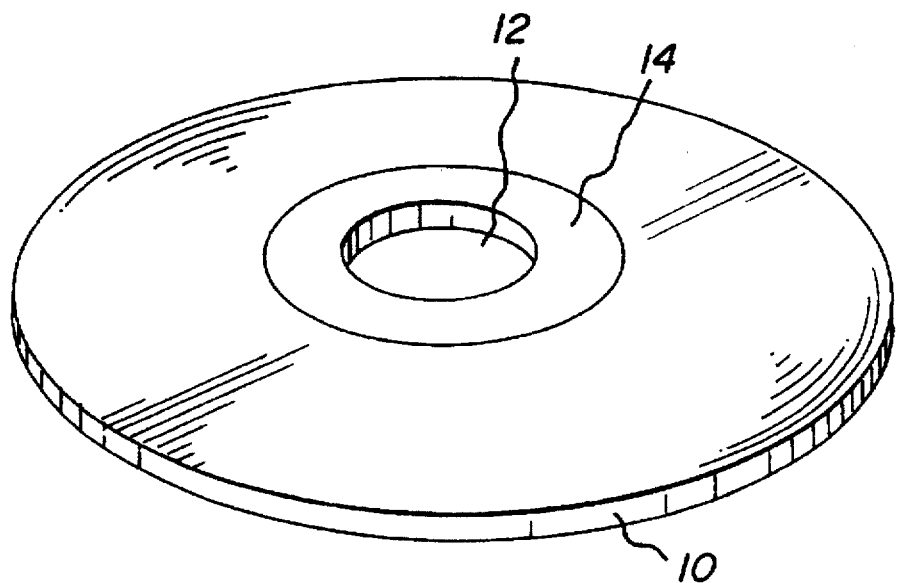
FIG. 1 is a perspective view of a conventional compact disk which can be used by an actuator in accordance with the present invention.

Referring to FIG. 1, a perspective view of a compact disk 10 which can be used by an actuator (See FIG. 4) in accordance with the present invention. The compact disk 10 includes a central opening 12 and a clamping region 14.

Figure 2:
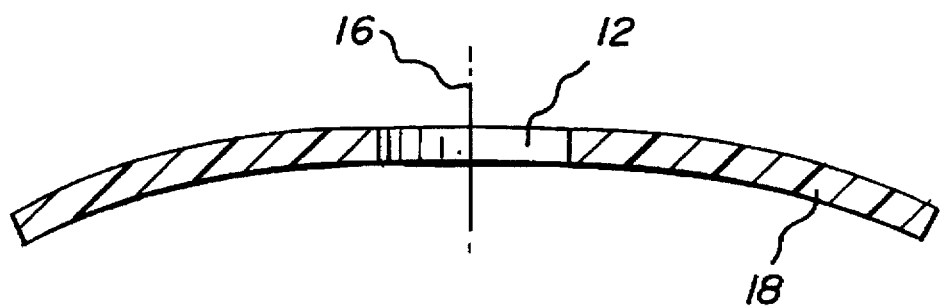
FIG. 2 is a side cross-sectional view of the compact disk of FIG. 1.

Referring to FIG. 2, a section view of a conventional compact disk 10 is shown. Where parts correspond to FIG. 1, the same numbers will be used. The compact disk writing surface 18 is shown. The compact disk 10 is typically curved or warped so as to be similar to a portion of a sphere. The deviation from flat and the displacement of the compact disk writing surface 18 as a function of radius is illustrated but is shown in an exaggerated manner for clarity. This curvature is a result of non-uniform shrinkage of the compact disk material in the manufacturing process. Although the compact disk 10 is shown to be curved toward the compact disk writing surface 18, the curvature can also be away from the compact disk writing surface 18. The magnitude of the curvature typically varies from compact disk to compact disk.

Figure 3:
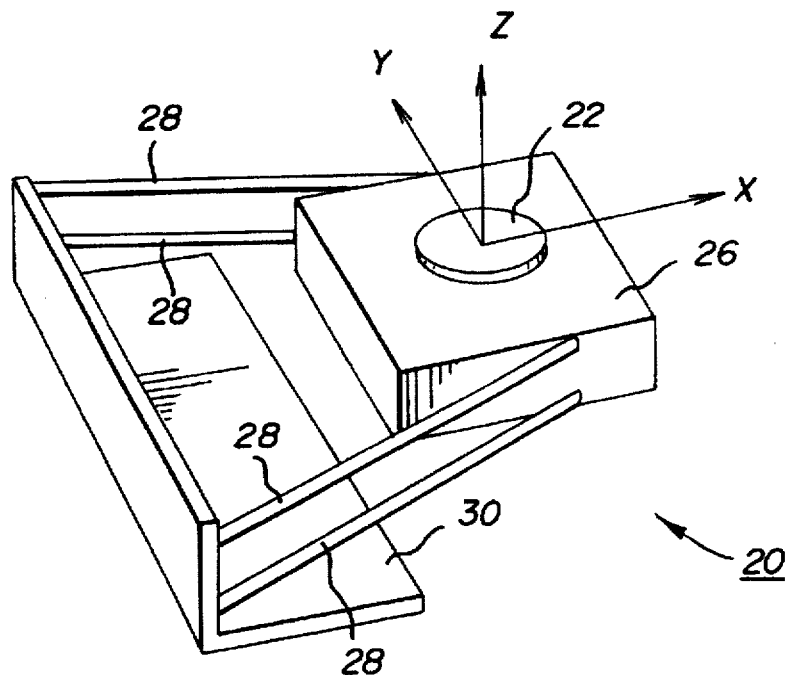
FIG. 3 is a perspective view of a prior art optical actuator.

Referring to FIG. 3, a perspective view of a conventional optical actuator 20 is shown. The optical actuator 20 includes a lens 22 which is well known in the art to focus a laser light beam on a surface of compact disk 10. Preferably, the compact disk 10 is an optical reading and/or recording disk. The lens 22 is fixed to a lens mount 26 by adhesives or other fastening structure (not shown). The optical actuator 20 further includes at least two pairs of spaced-apart flexures 28, which are arranged so that they are parallel when viewed from one side. Preferably, the flexures 28 include four injection-molded plastic parts. The flexures 28 are fixed at one end to the lens mount 26 and at their other ends to a base 30. The flexures also can be made of wire. Each flexure 28 is fixed to the lens mount 26. The problem with this arrangement is that it provides no compensation for the tilt changes in the compact disk writing surface 18.

Figure 4:
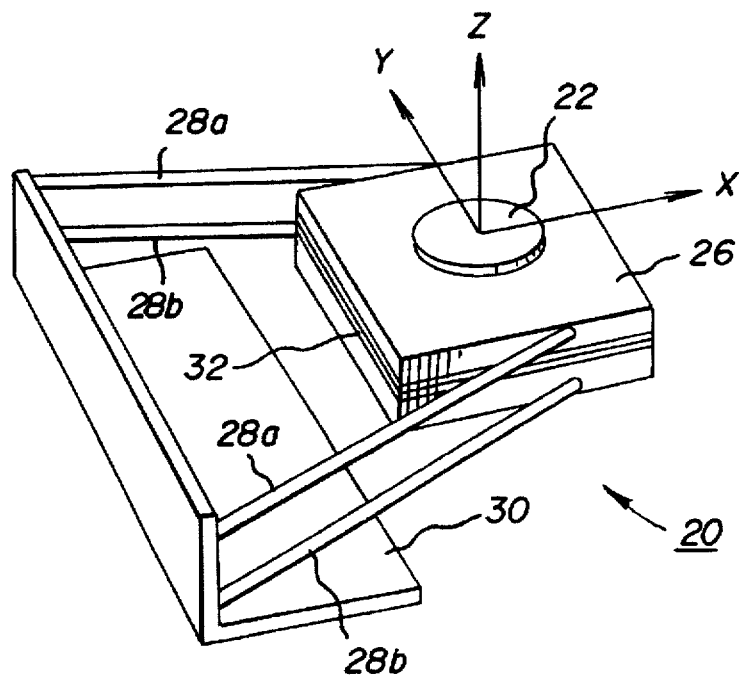
FIG. 4 is a perspective view of an optical actuator in accordance with the present invention.

Referring to FIG. 4, an optical actuator 20 in accordance with the present invention is shown. Where parts correspond to those in FIG. 3, the same numbers will be used. It should be noted that all the parts correspond except the flexures 28 are arranged differently. Each flexure pair 28 (two flexures on the same side of the lens mount 26) are substantially parallel when viewed from the top of the optical actuator 20 (along the Y axis). The ends of the upper flexures 28a attached to the lens mount 26 have been vertically shifted; one has been shifted up, and one down. The magnitude of each shift will depend on the actuator dimensions, but will typically be on the order of 1.0 mm. The lens mount 26 will now rotate about the X axis (a rotation known as "roll") when the lens mount is driven, a force is applied by a motor shown by a coil 32 which applies the force in the focus direction. Motors which drive actuators are well understood in the art and so for clarity of illustration only a single coil 32 has been schematically shown. The motor applies a force to the lens mount 26 to cause the flexures 28 to deflect such that as the lens 22 moves in a vertical direction to focus the light beam, it also rotates to maintain a nearly perpendicular alignment of the optical axis to the compact disk writing surface 18, minimizing the residual tilt error This rotation will be substantially proportional to the focus motion. The amount of deviation of the flexure ends from the parallel configuration will determine the magnitude of this roll. A preferred magnitude of roll will be on the order of 200 arc-minutes of rotation per mm of focus travel. This preferred value will depend on, among other things, the diameter of the compact disk 10. This desired optical actuator 20 behavior can also be achieved by shifting the base ends of the two lower flexures 28b, or the lens mount 26 ends of any of the flexures 28a, 28b, or a combination of shift can yield the same result. This flexure geometry causes focus motion (Z axis motion) of the optical actuator 20, as driven by the optical actuator 20 to result in significant rotation of the moving portion of the optical actuator 20. Therefore, any tilt error, caused by the previously described warp of a compact disk 10, is substantially compensated for. It has been determined experimentally that when viewed from the side (and each flexure of each pair is non-parallel) the distance should preferably be as follows. The distance between the flexure separation at the base and the flexure separation at the lens mount should be between 0.5 mm and 2.0 mm.

Figure 5:
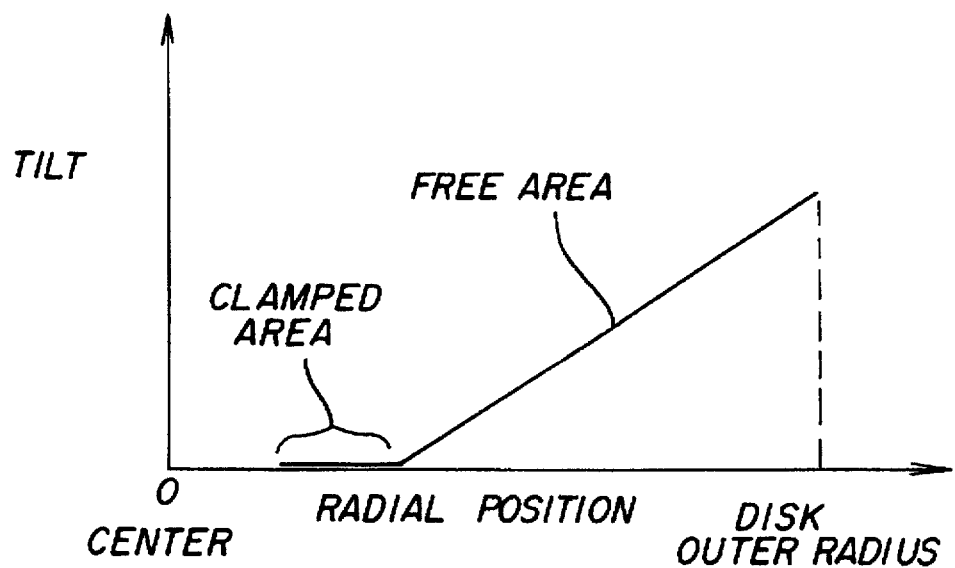
FIG. 5 is a plot of the tilt of the surface of the compact disk versus radial position for the compact disk shown in FIGS. 1 and 2.

Referring to FIG. 5, which illustrates in graphic form that the compact disk 10 tilt of the previously described warped compact disk 10 is a function of radius of the compact disk 10. The compact disk 10 clamped in its clamping region 14.

Figure 6:
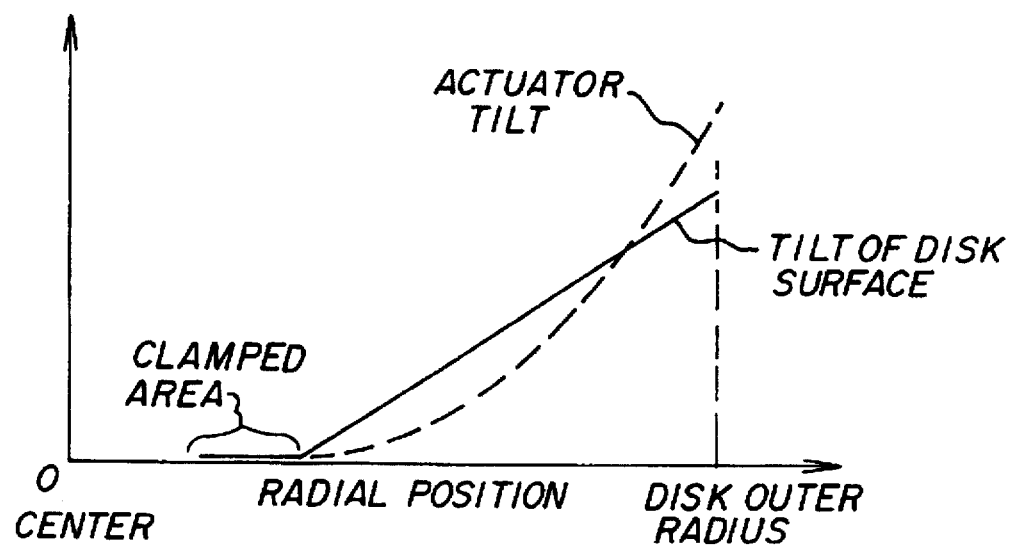
FIG. 6 is a plot of the tilt versus radial position of a conventional compact disk 10 and also the tilt of the actuator of FIG. 4.

Referring to FIG. 6, which illustrates in graphic form that the compact disk 10 tilt is a function of radius for a warped compact disk and the lens 22 tilt of the proposed actuator as a function of compact disk radius are shown. The tilt of the compact disk 10 is largely compensated for by the tilt of the lens 22.

Figure 7:
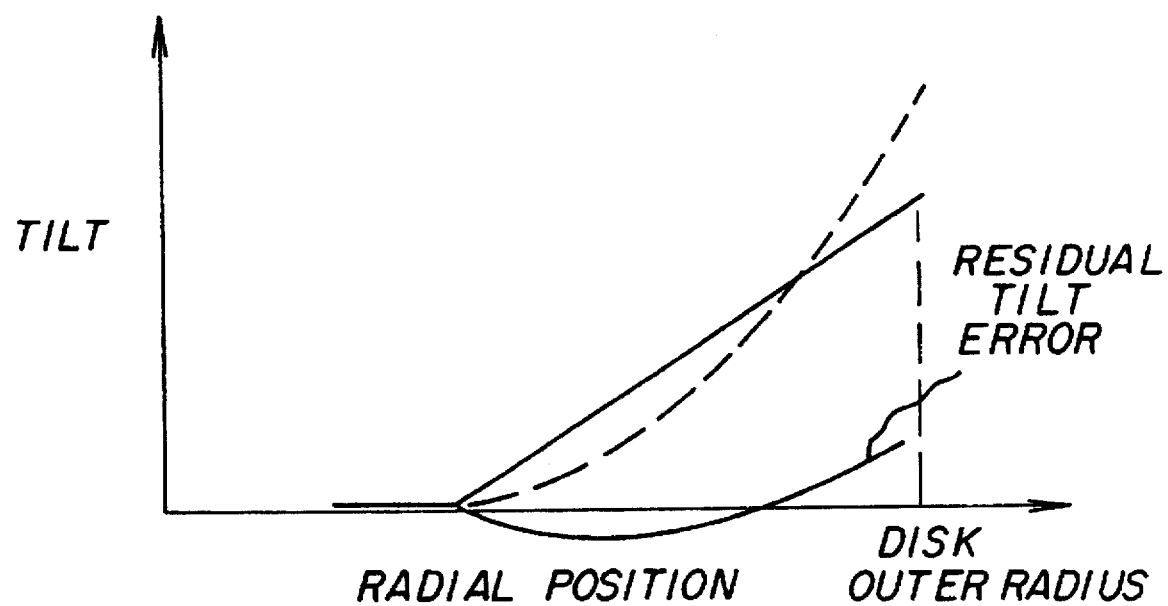
FIG. 7 is a plot of tilts versus radial position such as shown in FIG. 6 and the residual tilt error after compensation by the actuator of FIG. 4.

Referring to FIG. 7, the compact disk tilt, lens tilt and the residual uncompensated tilt error is illustrated graphically. The calculated compensation of the compact disk tilt is on the order of 80%. That is, the residual tilt error is approximately 20% of the original uncompensated compact disk tilt error. Note that this correction factor does not vary with either the magnitude of the compact disk 10 warp (within the limits of the optical actuator's focus range) or the direction (concave up or down). This results in improved system performance, particularly with highly warped compact disks.

The invention has been described in detail with particular reference to a preferred embodiment thereof. However, it will be understood that variations and modifications can be effected within the spirit and scope of the invention.

Parts List 10 compact disk
12 central opening
14 clamping region
16 spindle axis
18 compact disk writing surface
20 optical actuator
22 lens
26 lens mount
28 flexure
28a upper flexure
28b lower flexure
30 base
32 coil

What is claimed is:

1. An optical actuator for positioning a lens to focus a laser light beam on a surface of a compact disk, and to compensate for tilt errors in the surface of the compact disk, comprising:

a) a lens mount for supporting the lens;

b) a base;

c) at least two pairs of spaced-apart flexures, each pair of flexures being fixed to the lens mount and to the base, the flexures of one pair being arranged so that they are non-parallel when viewed from the side and the distance between flexures at the base is less than the distance at the position where they are mounted to the lens mount and the other pair of flexures being arranged so that they are non-parallel when viewed from the side and the distance between flexures at the base is greater than the distance at the position where they are mounted to the lens mount; and d) means for applying a force to the lens mount to cause the flexures to deflect such that as the lens moves in a vertical direction to focus the light beam, it also rotates to maintain a nearly perpendicular alignment of the optical axis to the compact disk surface, minimizing the residual tilt error.

2. The optical actuator of claim 1 wherein the flexures are injection molded plastic parts.

3. The optical actuator of claim 1 wherein the flexures are wires.

4. The optical actuator of claim 1 wherein each pair of flexures, when viewed from the side, is non-parallel and the difference between the flexure separation at the base and the flexure separation at the lens mount is between 0.5 mm and 2.0 mm.

5. The optical actuator of claim 4 wherein the flexures are injected molded plastic parts.

6. The optical actuator of claim 4 wherein the flexures are wires.

* * * * *